US012530000B2

(12) United States Patent
Wang et al.

(10) Patent No.: US 12,530,000 B2
(45) Date of Patent: Jan. 20, 2026

(54) HOUSING ASSEMBLY, WEARABLE DEVICE, AND ASSEMBLING METHOD

(71) Applicant: BEIJING XIAOMI MOBILE SOFTWARE CO., LTD., Beijing (CN)

(72) Inventors: Xuefeng Wang, Beijing (CN); Lei Meng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 226 days.

(21) Appl. No.: 18/195,363

(22) Filed: May 9, 2023

(65) Prior Publication Data

US 2024/0201635 A1 Jun. 20, 2024

(30) Foreign Application Priority Data

Dec. 20, 2022 (CN) ......................... 202211644002.5

(51) Int. Cl.

*G06F 1/16* (2006.01)
*G04G 17/04* (2006.01)
*G04G 17/08* (2006.01)

(52) U.S. Cl.

CPC ........... *G04G 17/08* (2013.01); *G04G 17/045* (2013.01); *G06F 1/163* (2013.01)

(58) Field of Classification Search

CPC ...... G04G 17/08; G04G 17/045; G04G 17/00; G04G 17/02; G04G 17/06; G04G 17/04; G06F 1/163; G06F 1/1698; H01Q 5/35; H01Q 1/273; H01Q 1/521; G04R 60/06

See application file for complete search history.

(56) References Cited

U.S. PATENT DOCUMENTS

| | | | | |
|---|---|---|---|---|
| 9,041,619 | B2 * | 5/2015 | McMilin | H01Q 5/314<br>343/904 |
| 10,075,206 | B1 * | 9/2018 | Erentok | G04G 9/06 |
| 10,447,080 | B2 * | 10/2019 | Jung | H04B 5/79 |
| 10,608,323 | B2 * | 3/2020 | Choi | H01Q 1/273 |
| 10,879,597 | B2 * | 12/2020 | Kang | H01Q 1/24 |
| 11,271,291 | B2 * | 3/2022 | Hanshew | H01Q 21/28 |
| 12,034,204 | B2 * | 7/2024 | Kang | H01Q 1/273 |

(Continued)

FOREIGN PATENT DOCUMENTS

| | | | |
|---|---|---|---|
| CN | 109301479 | A | 2/2019 |
| EP | 3291369 | A1 | 3/2018 |
| EP | 3944028 | A1 | 1/2022 |

OTHER PUBLICATIONS

The Extend European Search Report of Application No. 23176116.4,Dated on Nov. 16, 2023,(8P).

*Primary Examiner* — Rockshana D Chowdhury
(74) *Attorney, Agent, or Firm* — Arch & Lake LLP; Hao Tan; Shen Wang

(57) ABSTRACT

A housing assembly, a wearable device and an assembling method are provided. The housing assembly includes: a middle frame with an opening; a screen assembly that is located on the middle frame and covers the opening; an edge of the screen assembly provided with a stepped structure; an annular member that is disposed at the stepped structure of the screen assembly; a center of the annular member being aligned with a center of the opening; a connector that connects the annular member and the middle frame. Furthermore, at least one of the annular member or the middle frame is made of metal.

9 Claims, 6 Drawing Sheets

(56) References Cited

U.S. PATENT DOCUMENTS

| | | | | |
|---|---|---|---|---|
| 12,191,560 | B2 * | 1/2025 | Son | H01Q 21/28 |
| 2013/0278480 | A1 | 10/2013 | McMillin et al. | |
| 2014/0225786 | A1 * | 8/2014 | Lyons | H01Q 9/40<br>343/702 |
| 2016/0036120 | A1 * | 2/2016 | Sepänniitty | H01Q 1/243<br>343/702 |
| 2016/0254587 | A1 * | 9/2016 | Jung | H01Q 1/273<br>343/702 |
| 2018/0069300 | A1 * | 3/2018 | Choi | H01Q 9/0421 |
| 2019/0215794 | A1 * | 7/2019 | Sayem | H01Q 1/50 |
| 2021/0389795 | A1 * | 12/2021 | Chang | G06F 1/1698 |
| 2023/0418240 | A1 * | 12/2023 | Ryu | G06F 1/203 |
| 2023/0420868 | A1 * | 12/2023 | Papantonis | H01Q 1/273 |
| 2024/0201635 | A1 * | 6/2024 | Wang | H01Q 5/35 |
| 2024/0387984 | A1 * | 11/2024 | Marin | G04R 60/06 |

* cited by examiner

HOUSING ASSEMBLY, WEARABLE DEVICE, AND ASSEMBLING METHOD

CROSS-REFERENCE TO RELATED APPLICATION

This application is based on and claims priority to Chinese Patent Application No. 202211644002.5 filed on Dec. 20, 2022, the disclosure of which is hereby incorporated by reference in its entirety for all purposes.

BACKGROUND

With the popularization of the 5th Generation Mobile Communication Technology (5G) network, the integration of all things such as wearable devices and mobile terminals has gradually become a trend. Compared with traditional watches, the conventional wearable devices such as smart watches have brought more convenient functions to users, such as information, incoming call reminders, calls, sports health detection, etc.

SUMMARY

The present disclosure relates to the field of wearable device, and more specifically, to a housing assembly, a wearable device, and an assembling method, which can better improve the appearance effect.

According to a first aspect of the present disclosure, there is provided a housing assembly including a middle frame with an opening;

a screen assembly located on the middle frame and covering the opening; an edge of the screen assembly being provided with a stepped structure, an annular member disposed at the stepped structure of the screen assembly, in which a center of the annular member is aligned with a center of the opening, and a connector that connects the annular member and the middle frame. furthermore, at least one of the annular member or the middle frame is made of metal.

According to a second aspect of the present disclosure, there is provided a wearable device including: a housing assembly; and a device body fitted on the housing assembly, wherein the wearable device comprises: a middle frame with an opening; a screen assembly located on the middle frame and covering the opening, wherein an edge of the screen assembly comprises a stepped structure; an annular member disposed at the stepped structure of the screen assembly; wherein a center of the annular member is aligned with a center of the opening; and a connector that connects the annular member and the middle frame; wherein at least one of the annular member and or the middle frame is made of metal.

According to third aspect of the present disclosure, there is provided an assembling method, including: assembling the annular member at the stepped structure of the screen assembly, where a housing assembly includes a middle frame with an opening, the screen assembly, the annular member, and a connector; assembling the screen assembly on the middle frame, such that the screen assembly may cover the opening of the middle frame; and connecting the annular member and the middle frame through the connector, in which at least one of the annular member or the middle frame is made of metal.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the present disclosure, illustrate embodiments/examples consistent with the present disclosure and, together with the description, serve to explain the principles of the present disclosure.

DETAILED DESCRIPTION

Description will now be made in detail to examples, examples of which are illustrated in the accompanying drawings. The following description refers to the accompanying drawings in which the same numbers in different drawings represent the same or similar elements unless otherwise indicated. The implementations in the following description of examples do not represent all implementations consistent with the present disclosure. Instead, they are merely examples of apparatuses and methods consistent with some aspects of the present disclosure as detailed in the appended claims.

Reference throughout this specification to “one embodiment,” “an embodiment,” “an example,” “some embodiments,” “some examples,” or similar language means that a particular feature, structure, or characteristic described is included in at least one embodiment or example. Features, structures, elements, or characteristics described in connection with one or some embodiments are also applicable to other embodiments, unless expressly specified otherwise.

The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In the process of designing a smart watch, usually the antenna needs to be formed on the middle frame through an additional nano-injection molding process, and there is a problem that the structure of the smart watch is complicated.

Figure 1:
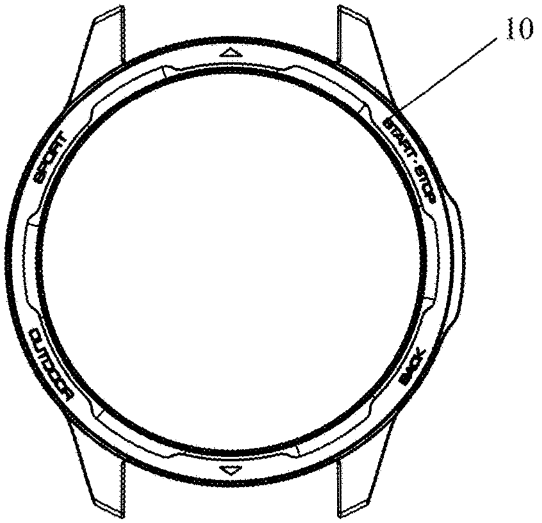
FIG. 1 (Prior Art)
FIG. 1 is an overall schematic diagram of a conventional housing structure shown according to an example.
Figure 2:
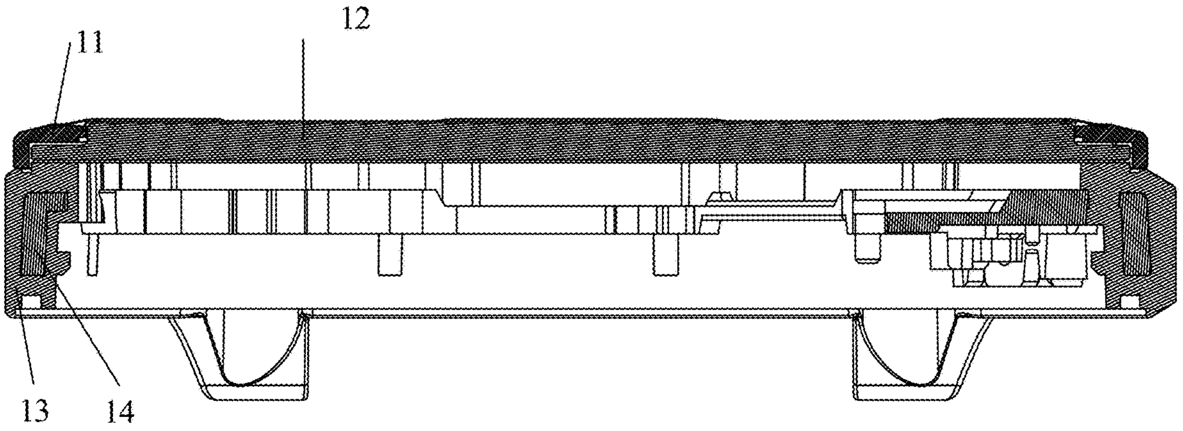
FIG. 2 (Prior Art)
FIG. 2 is a schematic cross-sectional diagram of a conventional housing structure shown according to an example.

As shown in FIGS. 1 and 2, a housing structure 10 of a wearable device includes a metal decorating member 11, a display cover plate 12 and a plastic cement middle frame 13. The plastic cement middle frame 13 is made by adopting a nano-injection molding process and is internally equipped with a metal inserted element 14 for realizing the antenna function. However, the antenna of the wearable device needs to be formed through an additional nano-injection molding process, there is the problem of a complex structure, and the plastic cement middle frame lacks metal texture, which affects the appearance of the wearable device.

Figure 3:
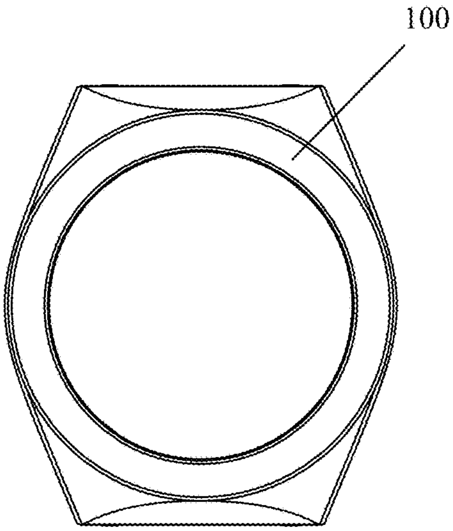
FIG. 3 is an overall schematic diagram of a housing assembly of the present disclosure shown according to an example.
Figure 4:
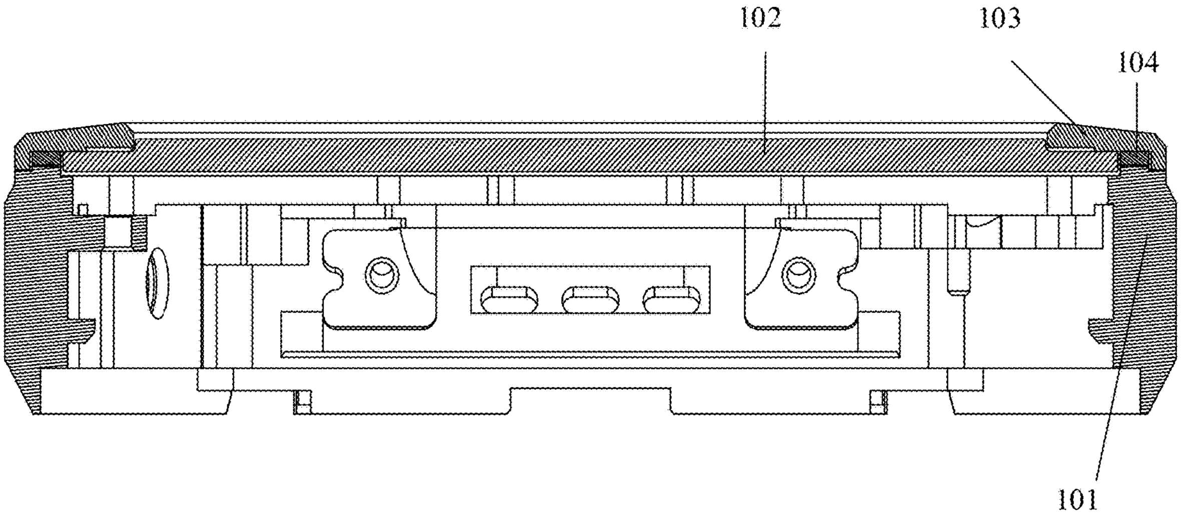
FIG. 4 is a first cross-sectional schematic diagram of a housing assembly of the present disclosure shown according to an example.

In view of this, the embodiments of the present disclosure provide a housing assembly. As shown in FIGS. 3 and 4, the housing assembly 100 includes:

- a middle frame 101 with an opening;
- a screen assembly 102 that is located on the middle frame 101 and covers the opening; an edge of the screen assembly 102 being provided with a stepped structure;
- an annular member 103 (also called as a ring piece) that is disposed at the stepped structure of the screen assembly 102; and a center of the annular member 103 is aligned with a center of the opening; and
- a connector 104 that connects the annular member 103 and the middle frame 101;
- in which at least one of the annular member 103 and the middle frame 101 is made of metal.

In the embodiments of the present disclosure, the housing assembly is applied in a wearable device, the housing assembly can be a protective housing of the wearable device, can reduce the damage to the functional devices within the wearable device to extend the lifespan of the wearable device.

The above-described middle frame can be a carrier of the wearable device, and can carry the device body of the wearable device. The device body includes various types of detection sensors, etc., which is not limited in the embodiments of the present disclosure.

In the embodiments of the present disclosure, when the middle frame is made of metal, the middle frame can be formed by the metal such as iron, aluminum or aluminum alloy etc. The shape of the middle frame can be square or circular, which is not limited in the embodiments of the present disclosure.

The above-described middle frame has an opening, which is used for revealing the screen assembly of the wearable device. The shape and size of the opening can be configured according to the shape and size of a display surface of the screen assembly. For example, it can be configured that the shape of the display surface of the screen assembly is similar to or the same as that of the opening. For another example, the size of the display surface of the screen assembly can be configured equal to the size of the opening.

The above-described screen assembly is located on the middle frame. The housing assembly can include a bonding structure, which is located between the screen assembly and the middle frame, and is used for fixating the screen assembly on the middle frame, such that the assembling of the housing assembly is more reliable.

The above-described screen assembly covers the opening and forms an accommodating space together with the middle frame. In the embodiments of the present disclosure, the screen assembly can include a screen cover plate and a display body. In some embodiments, the screen assembly covering the opening can include: a screen cover plate covers the opening, and the accommodating space is used for accommodating the display body and the device body; in some other embodiments, the screen assembly and the display body both cover the opening, and the accommodating space is used for accommodating the device body.

In the embodiments of the present disclosure, the screen cover plate is formed by a transparent material, such that the screen cover plate can not only protect the display body but also will not block the display surface of the display body.

It should be noted that the transparent material can include transparent glass or transparent plastic, which is not limited in the embodiments of the present disclosure.

An edge of the above-described screen assembly is provided with a stepped structure. The edge of the screen assembly includes a first edge portion and a second edge portion which are adjacent, and a distance from the first edge portion to a center of the screen assembly is smaller than a distance from the second edge portion to the center of the screen assembly. The stepped structure is formed by the first edge portion and the second edge portion being respectively recessed toward the direction of the middle frame; in which a recess depth of the first edge portion is smaller than a recess depth of the second edge portion; and the recess depth of the second edge portion can be equal to or less than a thickness of the screen assembly.

The center of the above-described annular member is aligned with the center of the opening, that is to say, a connecting line between the center of the annular member and the center of the opening is a straight line.

In the embodiments of the present disclosure, the annular member may be decorative rings, circular decorative pieces, circular DECO etc., and is located at the stepped structure of the screen assembly, and is connected to the middle frame through the connector. The annular member can include a first decorating part connected to the stepped structure and a second decorating part connected to the middle frame. In this way, on the one hand, the joint between the screen assembly and the middle frame can be covered by the first decorating part of the annular member, which plays a decorative role; on the other hand, the second decorating part of the annular member is connected to the middle frame, such that the stable assembly of the annular member on the middle frame can be realized.

In some embodiments, the annular member covers a non-display area of the screen assembly. In this way, the annular member can function as decorating the screen assembly. In the embodiments of the present disclosure, a width of the annular member can be greater than or equal to a width of the non-display area, which is not limited in the embodiments of the present disclosure.

In some embodiments, the screen assembly includes a screen cover plate, and a surface of the annular member away from the middle frame is located on the same plane as the screen cover plate. In this way, the appearance effect of the housing assembly can be improved.

In the embodiments of the present disclosure, the surface of the annular member facing away from the middle frame can be regarded as a top surface of the annular member, and the surface of the annular member close to or in contact with the middle frame can be regarded as a bottom surface of the annular member, which is not limited in the embodiments of the present disclosure.

At least one of the annular member and the middle frame described above is made of metal, i.e., the annular member, the middle frame, or the annular member and the middle frame is/are made of metal. Both the metal middle frame and the metal annular member can be multiplexed as an antenna. That is to say, both the metal middle frame and the metal annular member can radiate a first wireless signal under the excitation of a first radio frequency signal; and can also convert a received second wireless signal into a second radio frequency signal. In this way, the function of transceiving wireless signals can be realized based on the metal middle frame and the metal annular member.

In the embodiments of the present disclosure, when the annular member is made of metal and/or the middle frame is made of metal, the examples of the present disclosure can directly use the metal annular member and/or the metal middle frame as the antenna without forming an antenna on the middle frame additionally through a nano-injection molding process, which can make the structure of the wearable device simpler. Moreover, when the middle frame is made of metal, compared with the conventional plastic cement middle frame, the metal middle frame of the examples of the present disclosure can better improve the appearance effect, thereby improving the use experience of users. In addition, when the annular member is made of metal and the middle frame is not made of metal, since the metal annular member is far away from the wearer object, using the metal annular member as an antenna can therefore reduce the signal interference and improve the transceiving performance of the antenna.

In some examples, when both the annular member and the middle frame are metal piece, the connector is an insulating member to isolate the middle frame and the annular member; or, the connector is a conductive member, so as to form is an antenna radiator integrally with the annular member and the middle frame.

In the examples of the present disclosure, when both the annular member and the middle frame are metal piece, the connector is an insulating member used for isolating the middle frame and the annular member. In this way, when the metal annular member and the metal middle frame are used as antenna radiators of two different frequency bands, the isolation degree between the two antenna radiators for transceiving wireless signals can be improved.

The above-described connector is a conductive member, thus the annular member and the middle frame will be electrically connected, and then it can be formed that the middle frame and the annular member receive and transmit wireless signals together.

It should be noted that the conductive member can not only be used for fixating the annular member on the middle frame, but also be used for electrically connecting the annular member and the middle frame. Exemplarily, the conductive member can include conductive foam or a conductive riveting structure, etc., which is not limited in the examples of the present disclosure.

In the examples of the present disclosure, the housing assembly further includes an insulating part. When the connector is a conductive member, both the insulating part and the conductive member are disposed between the annular member and the middle frame, and the insulating part is located at a side of the conductive member facing toward the outside of the housing assembly.

It should be noted that the insulating part includes insulating varnish, which can be coated on a surface of the annular member facing toward the middle frame, and can also be coated on a surface of the middle frame facing toward the annular member, which is not limited in the examples of the present disclosure.

In the examples of the present disclosure, when both the annular member and the middle frame are metal piece, the connector is a conductive member, and used for forming an integrated antenna radiator together with the annular member and the middle frame. In this way, when the antenna radiator receives and transmits wireless signals, the annular member and the middle frame can be made grounded without coupling, thereby the impact of coupling can be reduced, and the antenna performance when the annular member and the middle frame are multiplexed as antennas is improved. Moreover, compared with the conventional plastic cement middle frame, the metal middle frame of the examples of the present disclosure can better improve the appearance effect, and further improve the use quality of the users.

Figure 5:
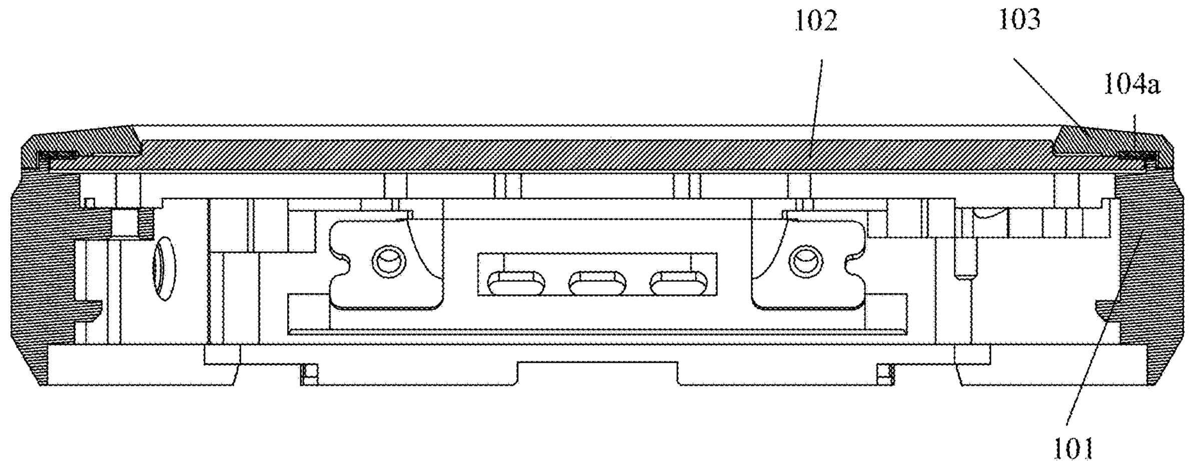
FIG. 5 is a second schematic cross-sectional view of a housing assembly of the present disclosure shown according to an example.

In some examples, as shown in FIG. 4 and FIG. 5, the conductive member includes conductive foam 104*a*; and the conductive foam 104*a* is filled in a gap between the middle frame 101 and the annular member 103.

The above-described conductive foam is a type of wrapped conductive foam. Here, the conductive foam can be formed by wrapping along a circle of surface of the foam with a conductive cloth and then cold pressing. Herein, the conductive cloth can be formed by gold plating or nickel plating, which is not limited in the examples of the present disclosure.

The above-described conductive foam can play not only the role of bonding and fixating, but also the role of conductive connection.

In the examples of the present disclosure, the annular member and the middle frame can be connected through the conductive foam, such that the annular member and the middle frame can form a conductive connection on the basis of bonding the annular member and the middle frame, and then there is no coupling produced between the annular member and the middle frame, which can reduce the impact brought by coupling and improve the antenna performance.

In some examples, the conductive member can also include a conductive riveting structure;

the conductive riveting structure connects the annular member and the middle frame.

That is to say, in the examples of the present disclosure, the conductive connection between the annular member and the middle frame can be realized through the conductive foam structure or the conductive riveting structure, such that the conductive connection between the annular member and the middle frame is more flexible.

In the examples of the present disclosure, the conductive riveting structure can include a conductive nail head, and the annular member and the middle frame are connected through the conductive nail head. In some examples, as shown in FIG. 5, the conductive foam 104*a* includes a first portion located between the annular member and the middle frame and a second portion connected with the first portion;

the second portion is connected between the annular member 103 and the screen assembly 102.

That is to say, the conductive foam can be connected not only between the annular member and the middle frame, but also between the annular member and the screen assembly. In this way, on the basis of realizing the conductive connection between the annular member and the middle frame through the conductive foam, connecting the conductive foam between the annular member and the screen assembly can play a role of cushioning and protection for the screen assembly when the wearable device falls, which can improve the reliability of the wearable device.

Figure 6:
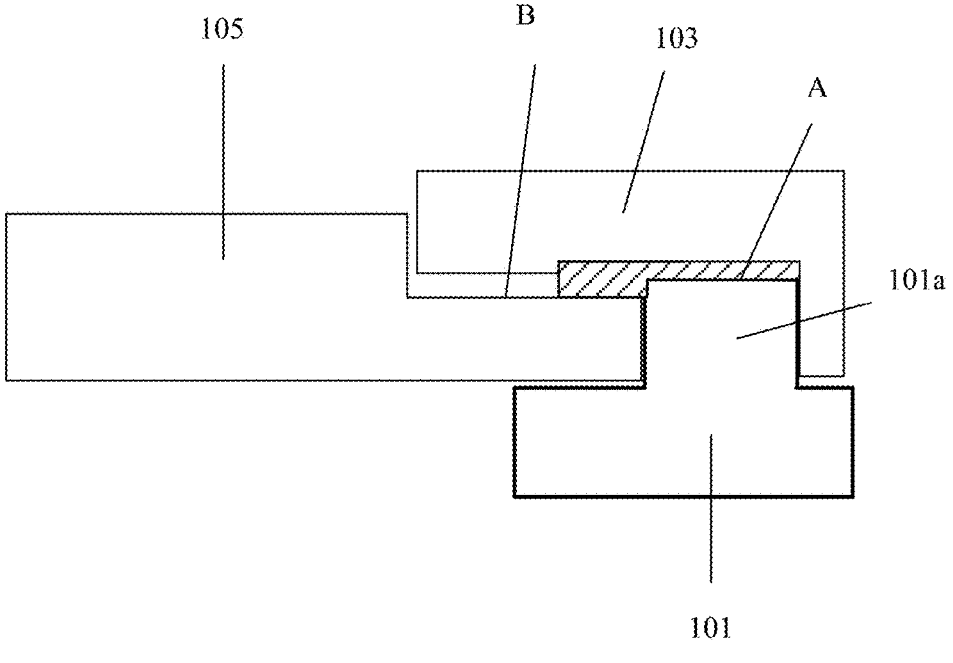
FIG. 6 is a partially enlarged schematic diagram of a stepped structure according to an example.

In some examples, as shown in FIG. 6, a first convex rib 101*a* that connects the first portion is formed on the middle frame 101;

a distance between a first surface A connecting the first portion in the first convex rib 101*a* to the annular member 103 is smaller than a distance between a second surface B connecting the second portion in the stepped structure 105 to the annular member 103;

a distance from the first surface A to the second surface B is between 0.03 mm and 0.07 mm.

In the examples of the present disclosure, the first convex rib is formed by the middle frame protruding toward the direction of the annular member.

It should be noted that the distance from the first surface to the annular member is smaller than the distance from the second surface to the annular member; and the distance from the first surface to the second surface is between 0.03 mm and 0.07 mm. That is to say, the first surface is higher than the second surface by a distance between 0.03 mm and 0.07 mm when looking down on the housing assembly. For example, the distance by which the first surface is higher than the second surface can be 0.05 mm.

In this way, the examples of the present disclosure can take into account an actual assembly tolerance of the housing assembly, such that the first convex rib of the middle frame can be better connected to the annular member through the conductive foam, better connection of the annular member and the middle frame by the annular conductive foam can be realized, and better conduction and grounding between the annular member and the middle frame can be realized.

In some examples, the conductive foam is annular in shape.

Figure 8:
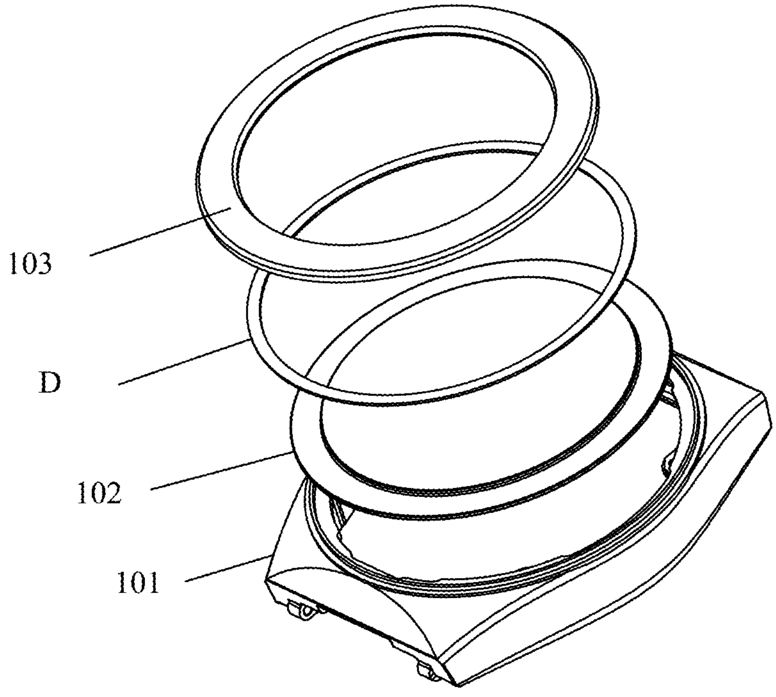
FIG. 8 is a second exploded schematic diagram of a housing assembly of the present disclosure shown according to an example.

That is to say, as shown in FIG. 8, the examples of the present disclosure can make the conductive connection between the annular member and the middle frame more stable by connecting the annular member 103 and the middle frame 101 through the annular conductive foam D.

In some examples, as shown in FIG. 8, the annular conductive foam D is formed by putting the strip-shaped conductive foam D to go through the die-cutting process.

That is to say, in the examples of the present disclosure, the annular conductive foam formed by die-cutting the strip-shaped conductive foam can realize better conduction and grounding of the annular member and the middle frame.

Exemplarily, the strip-shaped conductive foam can include the cuboid-shaped conductive foam or the cube-shaped conductive foam, which is not limited in the examples of the present disclosure.

In some examples, the conductive foam is divided into multiple sections, and the conductive foam in each section is used as a feed point to stimulate the antenna radiator to receive and transmit wireless signals in different frequency bands.

Figure 7:
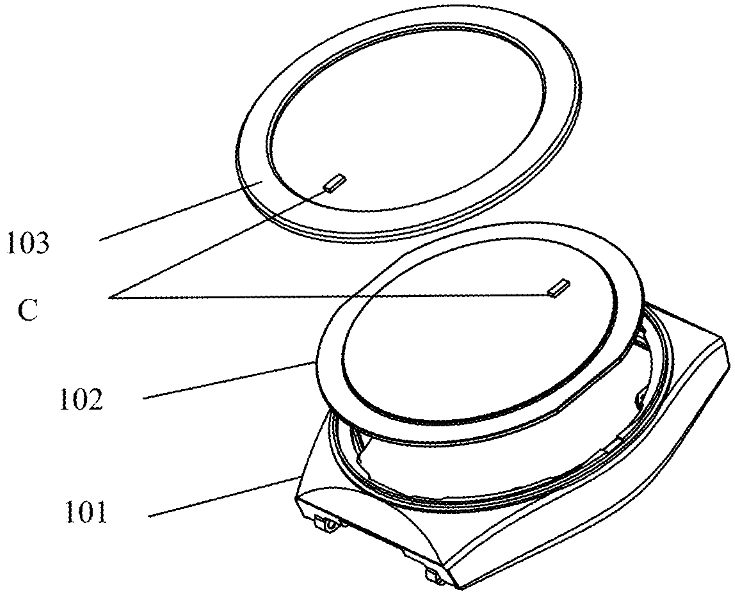
FIG. 7 is a first exploded schematic diagram of a housing assembly of the present disclosure shown according to an example.

That is to say, as shown in FIG. 7, based on the two sections of conductive foam C serving as the feed points, the wearable device can have the antenna functions of transceiving in different frequency bands, which not only enriches the antenna functions of the wearable device, but also does not require additionally forming an antenna through a nano-injection molding process in the middle frame, which can make the structure of the wearable device simpler.

In some examples, the housing assembly is further provided with a positioning part, and the positioning part is used for positioning the annular member and the middle frame when the annular member and the middle frame are assembled.

In the examples of the present disclosure, the positioning part can be disposed on the annular member, and can also be disposed on the middle frame. In some examples, the positioning part can be integrally formed with the annular member; or the positioning part can be integrally formed with the middle frame.

A positioning end surface of the above-described positioning part can be an arc surface or a plane, which is not limited in the examples of the present disclosure.

The above-described positioning part includes a protrusion or an inserting groove, which is not limited in the examples of the present disclosure.

In some examples, the housing assembly further includes:

a dispensing structure that is connected between the annular member and the screen assembly, and used for bonding the annular member and the screen assembly.

In the examples of the present disclosure, the annular member and the screen assembly are bonded by a dispensing structure, such that the annular member can be better fixated on the screen assembly.

It should be noted that the second portion of the conductive foam is connected between the annular member and the screen assembly. Here, the second portion and the dispensing structure can be distributed at different positions between the annular member and the screen assembly. In this way, the housing assembly not only can realize cushioning and protection of the screen assembly through the conductive foam when the wearable device falls, but also can better fixate the annular member on the screen assembly through the dispensing structure.

In some examples, the annular member is provided with a second convex rib on a surface facing toward the stepped structure;

the dispensing structure is distributed around the second convex rib, and a dispensing thickness of the dispensing structure is equal to a protruding length of the second rib.

In the examples of the present disclosure, the second convex rib is formed by protruding from the annular member toward the direction of the stepped structure. When the annular member is fixated on the stepped structure of the screen assembly by the dispensing structure, the thickness of glue coating the dispensing structure is equal to the protruding length of the second convex rib. In this way, the dispensing thickness of the dispensing structure can be controlled by setting the second rib, so as to achieve better assembling of the housing assembly.

The examples of the present disclosure also provide a wearable device, and the wearable device includes:

the housing assembly as described in one or more examples above;

a device body assembled on the housing assembly;

a belt-shaped connector that is connected to both sides of the housing assembly, and forms a wearing loop around the housing assembly.

The above-described wearable device can include a smart watch, a smart bracelet or a smart head-mounted device; the above-described device body includes various types of detection sensors, etc., and is used for realizing various functions of the wearable device. For example, when the wearable device is a smart watch, the device body can sense the movement data of the wearer object through various types of sensors, and display the movement data on the display screen.

In the examples of the present disclosure, when the wearable device is a smart watch or a smart bracelet, the belt-shaped connector can be a strap of a smart watch or a bracelet of a smart bracelet; and when the wearable device is a smart head-mounted device, the belt-shaped connector can be a head ring or a headband.

In the examples of the present disclosure, the wearable device can include a housing assembly. When the annular member is made of metal and/or the middle frame is made of metal, the examples of the present disclosure can directly take the metal annular member and/or the metal middle frame as an antenna without additionally forming an antenna on the middle frame through a nano-injection molding process, which can make the structure of the wearable device simpler. Moreover, when the middle frame is made of metal, compared with the conventional plastic cement middle frame, the metal middle frame of the examples of the present disclosure can better improve the appearance effect, thereby improving the use quality of the users. In addition, when the annular member is made of metal and the middle frame is not made of metal, since the metal annular member is far away from the wearer object, using the metal annular member as an antenna can therefore reduce the signal interference and improve the transceiving performance of the antenna.

Figure 9:
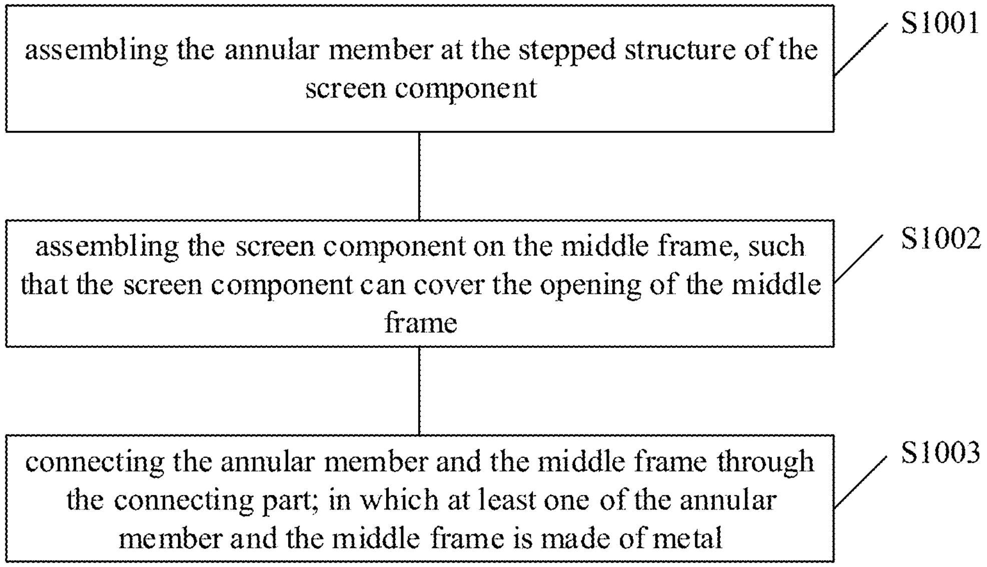
FIG. 9 is a schematic flowchart of an assembling method of the present disclosure shown according to an example.

The examples of the present disclosure further provide an assembling method, as shown in FIG. 9, the assembling method at least includes the following steps:

- S1001, assembling the annular member at the stepped structure of the screen assembly;
- S1002, assembling the screen assembly on the middle frame, such that the screen assembly can cover the opening of the middle frame; and
- S1003, connecting the annular member and the middle frame through the connector; in which at least one of the annular member and the middle frame is made of metal.

In the examples of the present disclosure, both the middle frame and the annular member need to be assembled with the screen assembly, the annular member can be assembled at a first position of the stepped structure of the screen assembly, and the middle frame can be assembled at a second position of the stepped structure; in which the second position and the first position are located on different surfaces of the stepped structure.

It should be noted that the edge of the screen assembly can include a first edge portion and a second edge portion that are adjacent; the stepped structure can be formed by the first edge portion and the second edge portion being respectively recessed toward the middle frame; the first position can be a position where the first edge component is recessed toward the middle frame, and the second position can be a position where the second edge component is recessed toward the middle frame. A recessed depth of the first edge portion is smaller than a recessed depth of the second edge portion; and a recessed depth of the second edge portion can be equal to or smaller than a thickness of the screen assembly.

In the examples of the present disclosure, when the annular member is made of metal and/or the middle frame is made of metal, the examples of the present disclosure can directly use the metal annular member and/or the metal middle frame as the antenna without additionally forming an antenna on the middle frame through a nano-injection molding process, which can make the structure of the wearable device simpler. Moreover, when the middle frame is made of metal, compared with the conventional plastic cement middle frame, the metal middle frame of the examples of the present disclosure can better improve the appearance effect, thereby improving the use experience of the user. In addition, when the annular member is made of metal and the middle frame is not made of metal, since the metal annular member is far away from the wearer object, using the metal annular member as an antenna can therefore reduce the signal interference and improve the transceiving performance of the antenna.

In some examples, the assembling the annular member at the stepped structure of the screen assembly includes:

- fixating the annular member at the stepped structure through a dispensing structure.

In the examples of the present disclosure, the annular member and the screen assembly are bonded through a dispensing structure, such that the annular member can be better fixated on the screen assembly.

In some examples, the method further includes:

- bonding the screen assembly and the middle frame through a bonding structure after the screen assembly is assembled on the middle frame.

In the examples of the present disclosure, the middle frame and the screen assembly are bonded through the bonding structure, such that the screen assembly can be better fixated on the middle frame.

In some examples, the connecting the annular member and the middle frame through the connector includes:

- assembling the connector on a surface of the annular member facing toward the stepped structure; and
- connecting the annular member and the middle frame through the connector after the screen assembly is assembled on the middle frame.

In the examples of the present disclosure, after the middle frame is assembled, the connector that has already been assembled can be directly connected to the middle frame, which can make the assembling more convenient.

Regarding the assembling methods in the above examples, the specific manners of respective examples have been described in detail in the examples related to the housing assembly and the wearable device, and details will not be described here.

The technical solutions provided by the examples of the present disclosure can include the following beneficial effects:

In the examples of the present disclosure, when the annular member is made of metal and/or the middle frame is made of metal, the examples of the present disclosure can directly use the metal annular member and/or the metal middle frame as an antenna without the need for additionally forming an antenna on the middle frame through a nano-injection molding process, which can make the structure of the wearable device simpler. Moreover, when the middle frame is made of metal, compared with the conventional plastic cement middle frame, the metal middle frame of the examples of the present disclosure can better improve the appearance effect, thereby improving the use experience of the user. In addition, when the annular member is made of metal and the middle frame is not made of metal, since the metal annular member is far away from the wearer object, using the metal annular member as an antenna can therefore reduce the signal interference and improve the transceiving performance of the antenna.

Figure 10:
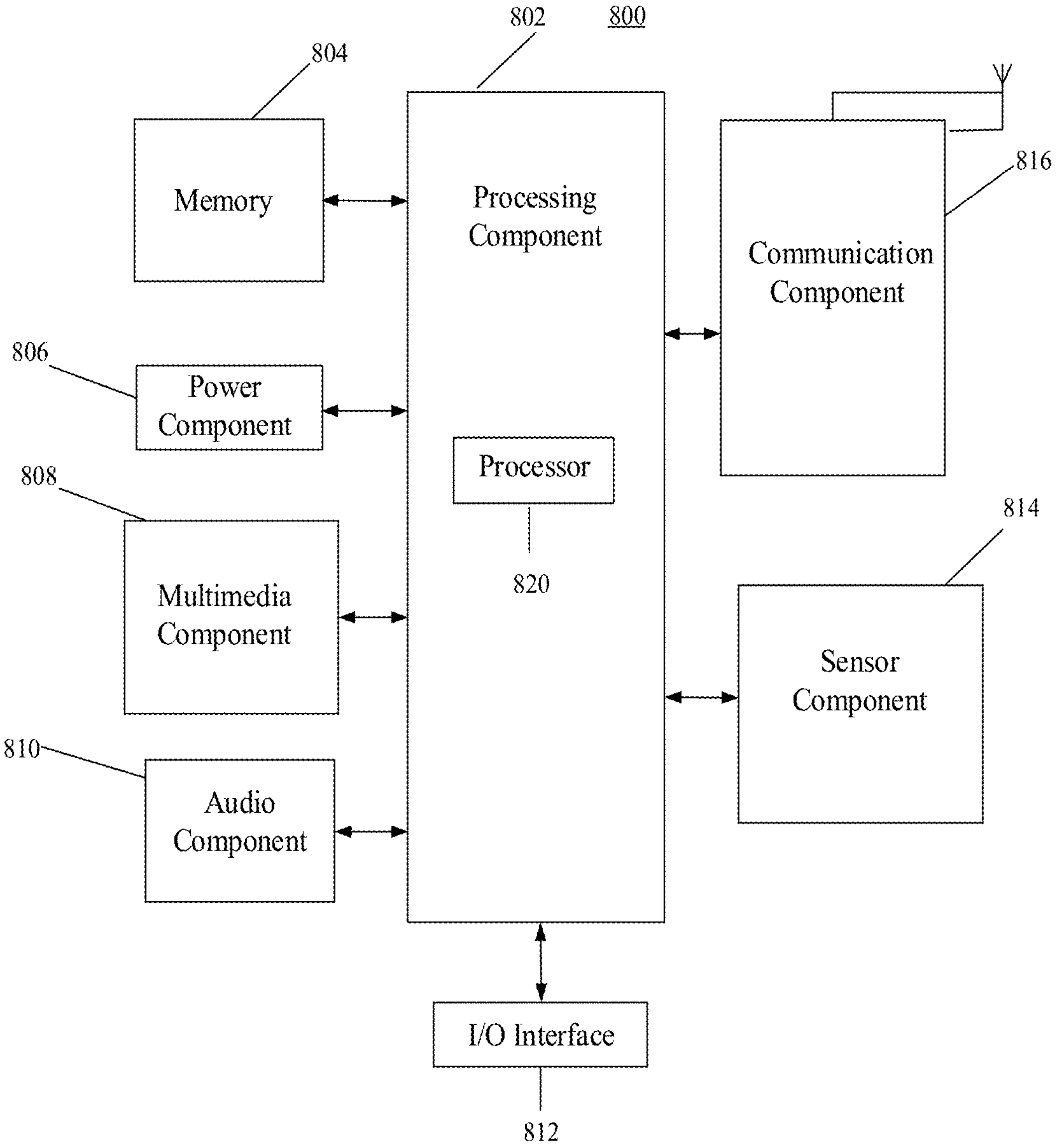
FIG. 10 is a block diagram of a wearable device according to an example.

FIG. 10 is a block diagram of a wearable device according to an example. Referring to FIG. 10, the wearable device 800 can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 can include one or more processors 820 to execute instructions to perform all or part of the steps in the above-described methods. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 can include a power management system, one or more power sources, and any other components associated with the generation, management, and distribution of power in the device 800.

The multimedia component 808 includes a screen providing an output interface between the device 800 and the user. In some examples, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some examples, the multimedia component 808 includes a front camera and/or a rear camera. The front camera and the rear camera can receive an external multimedia datum while the device 800 is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal can be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the device 800. For instance, the sensor component 814 can detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 can include a proximity sensor configured to detect the presence of nearby objects without any physical contact. The sensor component 814 can also include a light sensor, such as a CMOS or CCD image sensor, for use in imaging applications. In some examples, the sensor component 814 can also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as Wi-Fi, 2G, 3G, or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some examples, the device 800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In some examples, there is also provided a non-transitory computer-readable storage medium including instructions, such as included in the memory 804, executable by the processor 820 in the device 800. For example, the non-transitory computer-readable storage medium can be a ROM, a RAM, a CD-ROM, a magnetic tape, a floppy disc, an optical data storage device, and the like.

Some other examples of the present disclosure can be available to those skilled in the art upon consideration of the specification and practice of the various examples disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A housing assembly, comprising:

a middle frame with an opening;

a screen assembly located on the middle frame and covering the opening, wherein an edge of the screen assembly comprises a stepped structure;

an annular member disposed at the stepped structure of the screen assembly; wherein a center of the annular member is aligned with a center of the opening; and a connector that connects the annular member and the middle frame;

wherein at least one of the annular member or the middle frame is made of metal, and in response to the annular member and the middle frame both being metal pieces, the connector is a conductive member for forming an antenna radiator integrally with the annular member and the middle frame, wherein the conductive member comprises a conductive foam, and the conductive foam is filled in a gap between the middle frame and the annular member, wherein the conductive foam comprises a first portion located between the annular member and the middle frame and a second portion connected with the first portion;

and the second portion is connected between the annular member and the screen assembly, wherein a first convex rib connecting the first portion is formed on the middle frame;

a first distance from a first surface connecting the first portion in the first convex rib to the annular member is smaller than a distance from a second surface connecting the second portion in the stepped structure to the annular member; and a second distance from the first surface to the second surface is between 0.03 mm and 0.07 mm.

2. The housing assembly according to claim 1, wherein the conductive foam is divided into multiple sections, and each section of the conductive foam serves as a feed point to stimulate the antenna radiator to receive and transmit wireless signals in different frequency bands.

3. The housing assembly according to claim 1, wherein the conductive foam is annular in shape.

4. The housing assembly according to claim 1, wherein the housing assembly further comprises a positioning part, and the positioning part is used for positioning the annular member and the middle frame in response to assembling the annular member and the middle frame.

5. The housing assembly according to claim 1, wherein the housing assembly further comprises:

a dispensing structure connected between the annular member and the screen assembly, and used for bonding the annular member and the screen assembly.

6. The housing assembly according to claim 1, wherein the annular member covers a non-display area of the screen assembly.

7. The housing assembly according to claim 1, wherein the screen assembly comprises a screen cover plate, and a surface of the annular member facing away from the middle frame is located at a same plane as the screen cover plate.

8. A wearable device, comprising:

a housing assembly; and a device body fitted on the housing assembly, wherein the housing assembly comprises:

a middle frame with an opening;

a screen assembly located on the middle frame and covering the opening, wherein an edge of the screen assembly comprises a stepped structure;

an annular member disposed at the stepped structure of the screen assembly; wherein a center of the annular member is aligned with a center of the opening; and a connector that connects the annular member and the middle frame;

wherein at least one of the annular member and or the middle frame is made of metal, and in response to the annular member and the middle frame both being metal pieces, the connector is a conductive member for forming an antenna radiator integrally with the annular member and the middle frame, wherein the conductive member comprises a conductive foam, and the conductive foam is filled in a gap between the middle frame and the annular member, wherein the conductive foam comprises a first portion located between the annular member and the middle frame and a second portion connected with the first portion;

and the second portion is connected between the annular member and the screen assembly, wherein a first convex rib connecting the first portion is formed on the middle frame;

a first distance from a first surface connecting the first portion in the first convex rib to the annular member is smaller than a distance from a second surface connecting the second portion in the stepped structure to the annular member; and a second distance from the first surface to the second surface is between 0.03 mm and 0.07 mm.

9. The wearable device according to claim 8, wherein the conductive foam is divided into multiple sections, and each section of the conductive foam serves as a feed point to stimulate the antenna radiator to receive and transmit wireless signals in different frequency bands.

* * * * *